March 24, 1959     K. W. BENHAM     2,878,531
DOOR OPERATING TORSIONAL ROD ASSEMBLY
Filed Nov. 25, 1957     3 Sheets-Sheet 1
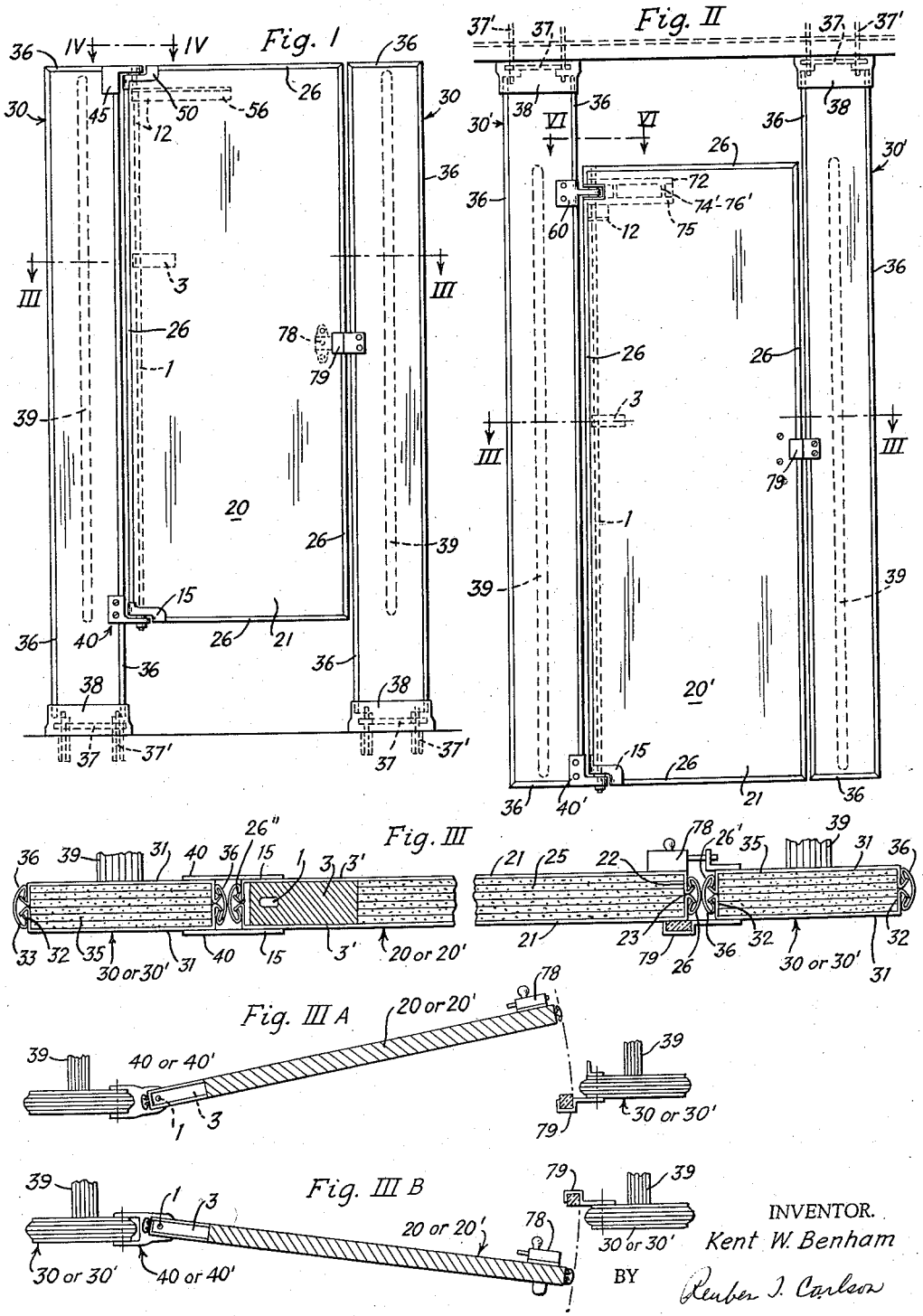
INVENTOR.
Kent W. Benham
BY
Reuben J. Carlson
ATTORNEY

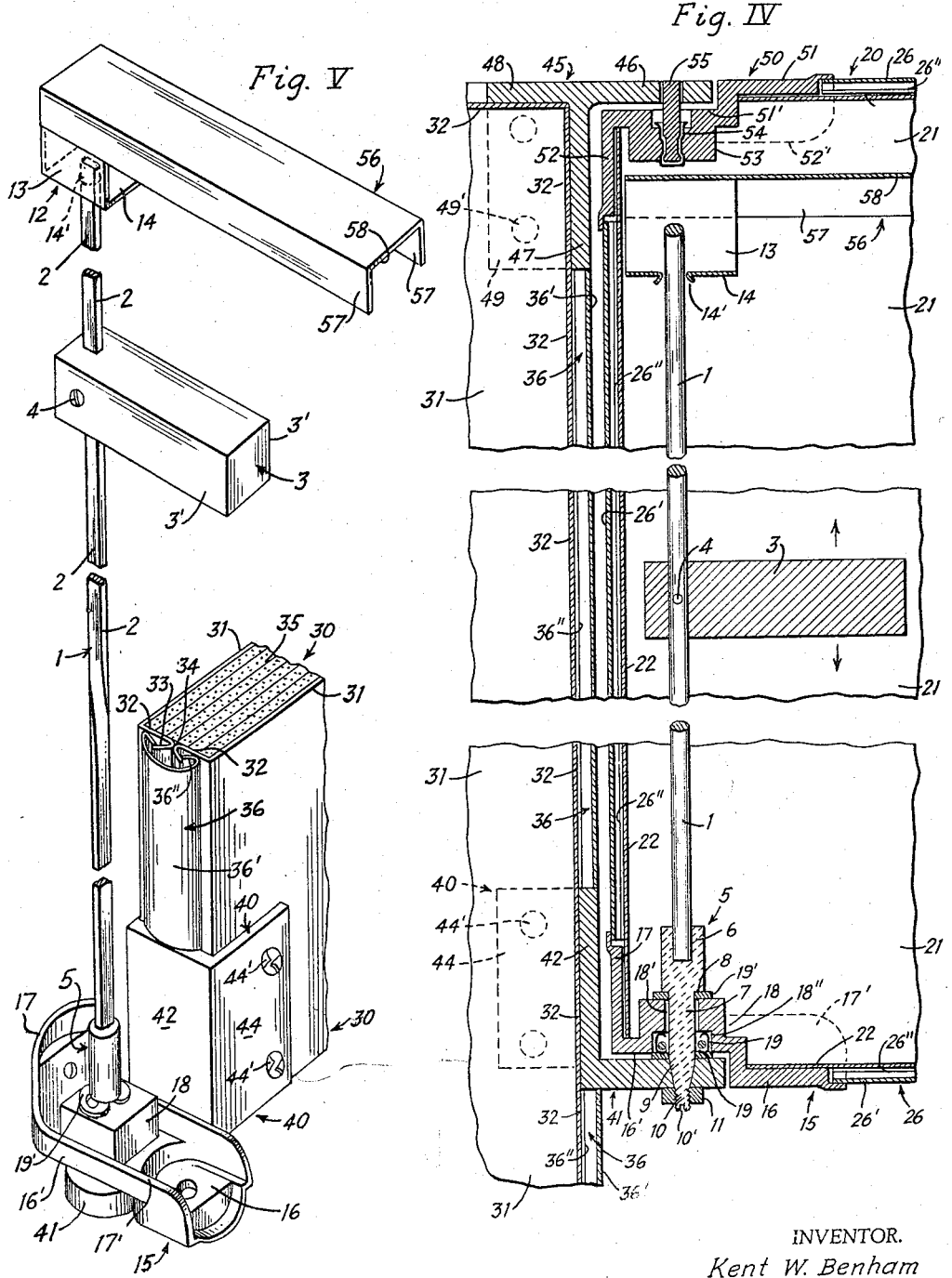

March 24, 1959
K. W. BENHAM
2,878,531
DOOR OPERATING TORSIONAL ROD ASSEMBLY
Filed Nov. 25, 1957
3 Sheets-Sheet 3
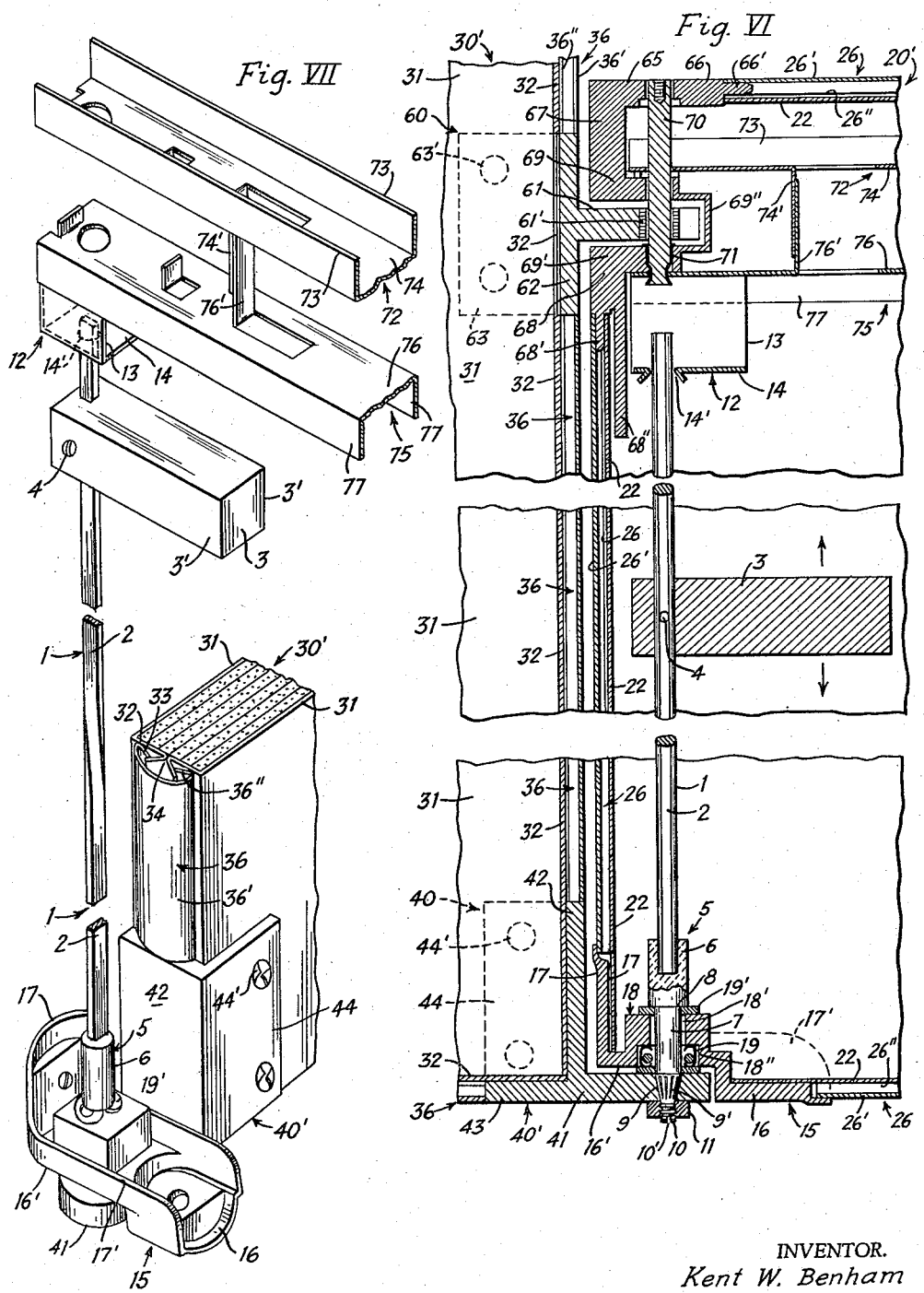
INVENTOR.
Kent W. Benham
BY
Reuben T. Carlson
ATTORNEY

United States Patent Office 2,878,531
Patented Mar. 24, 1959

2,878,531

DOOR OPERATING TORSIONAL ROD ASSEMBLY

Kent W. Benham, Gates Mills, Ohio, assignor to The Sanymetal Products Co., Inc., Cleveland, Ohio, a corporation of Ohio Application November 25, 1957, Serial No. 698,849

9 Claims. (Cl. 20—16)

This invention relates to door operating torsional rod assemblies, and more particularly to a door operating assembly which is concealed within the door body and structurally interrelated with parts of the door, and is adjustably locked to and supported by the projecting arm of a hinge bracket fixed to the adjacent post or pilaster which provides swinging support for the door.

The door operating torsional rod assembly of this invention is designed for installation within hollow metal doors during construction of the door to form a permanent part thereof. Such hollow metal doors may be constructed as stiled doors having hollow metal stiles and cross frames, or as flush doors formed by spaced metal panel sheets whose vertical and horizontal edges present inturned flanges secured together by spot welds or the like, and trimmed by edging strips which are secured or locked to the paired inturned flanges. Such hollow metal doors are usually packed with sound deadening and facing sheet bracing insulation which fills the door body throughout its length and breadth except for the space occupied by the torsional hinge assembly contained within the door body.

The torsional rod assembly of this invention comprises an elongated torsion rod of selected spring steel of high fatigue resistance and which uniformly retains its torsional resiliency during many years of use when forcibly twisted through an arc of 90°, and which truly returns to its untwisted state when the twisting force is relieved. One end of the torsion rod is rigidly fixed to a mounting pintle whose axis is in longitudinal alignment with the axis of the torsion rod. The other end of the mounting pintle extends through and is locked to the projecting arm of a door supporting hinge bracket fixed to the adjacent door supporting post or pilaster. The mounting pintle, formed of a rigid and untwisting material, also provides the pivot for a corner bracket which is fixed to the adjacent corner of the door body. The corner bracket is equipped with an internal bearing boss through which a section of the mounting pintle extends, the bearing boss also having an enlarged bearing cavity within which a thrust bearing assembly is pocketed. The thrust bearing assembly is designed to seat on the projecting arm of the pilaster attached door supporting hinge bracket in a manner so that the thrust bearing assembly provides substantially frictionless bearing support for the door corner bracket and its associated door body.

The door corner bracket, mounting pintle, bearing assembly and pilaster attached door supporting arm, cooperate to provide the main support for the door as a whole. However, the door is also pivotally connected to one or more pilaster attached secondary hinge brackets as by means of one or more hinge pintles whose longitudinal axes are in alignment with the longitudinal axes of the torsion rod and mounting pintle, and which serve to maintain the door in true swinging position. The hinging pintle or pintles, which are positioned in spaced relation to the mounting pintle, are not connected in any manner to the torsion rod, but are wholly independent thereof. The torsion rod has a free end which terminates within the upper section of the door body and is maintained in axial alignment with the mounting pintle and upper hinging pintle by a guide bracket suitably fixed within the door body, the guide bracket having an axially aligned guide hole through which the adjacent end of the torsion rod freely telescopes, and is shaped to permit free twisting movement of the upper end of the torsion rod.

Torsional force is applied to the torsion rod by means of a swing member whose sides are in pressure contact with the inside faces of the door panel facing sheets. The swing member has a conforming hole in one end thereof through which the torsion rod snugly telescopes, with the main body of the swing member extending normal to the torsion rod for some distance inwardly from the swinging edge of the door. The swing member is adjustably secured to the torsion rod by suitable means such as a set screw so that the swing member may be vertically fixed along the body of the torsion rod at any desired distance above the mounting pintle, thereby accommodating the door operating torsional rod of this invention to doors of various weights, as well as frictional and inertial resistance to swinging movement.

The extreme end of the mounting pintle projects through the outside face of the door supporting arm of the door supporting hinge bracket, and is equipped with a lock nut which may be adjusted to rigidly lock the mounting pintle to the door supporting arm of the hinge bracket. The exposed end of the mounting pintle is provided with a slot or other tool engaging deformation, to which a suitable tool may be applied after the door is swingably mounted, and by means of which the mounting pintle and torsion rod thereto attached may be angularly oriented as desired to set the door in any desired inactivated position, such as fully closed or ajar position. When the door is forcibly swung into a position to permit entry through the door opening, the swing member contained therein applies a corresponding torsional twisting force to the torsion rod, which force increases in proportion to the forced angular swing of the door. When the opening force applied to the door is released, the twisted torsion rod exerts a corresponding swinging force on the swing member which is applied to one of the inside faces of the panel facing sheets of the door so as to cause return of the door to the normally closed or semi-closed position to which the mounting pintle and associated torsion rod has been adjusted.

The torsional force required to effectively swing the door from forcibly opened position to its adjusted closed or semi-closed position, may be varied in accordance with the weight of the door and its frictional and inertial resistance to swinging movement, by an appropriate vertical adjustment of the mounted position of the swing member along the body of the torsion rod. Thus, the swing force applied to the opened door by the swing member may be increased by affixing the swing member, as by its adjusting screw, to a position on the body of the torsion rod which is closer to the mounting pintle, and the swing force to be applied to the opened door may be correspondingly reduced by adjustably mounting the swing member to a position on the body of the torsion rod which is spaced a greater distance away from the mounting pintle. By varying the adjusted position of the swing member on the body of the torsion rod, any desired swinging force may be automatically applied to the opened door as its weight, and frictional and inertial resistance to swinging movement, may require.

The torsional rod assembly of this invention is permanently embedded within the door body during construction thereof, and its swing member is adjusted to the known weight of the door, and its frictional and inertial resistance to swinging movement as fully mounted. In assemblying the door and its associated torsional rod assembly, the aligning guide bracket, the torsion rod itself and its associated swing member and mounting pintle, are placed in position along the inside face of one of the panel facing sheets which is to form one side of the door body. The sound deadening and panel sheet bracing insulation is then secured to the first panel facing sheet in surrounding relation to the guide bracket, torsion rod, swing member and mounting pintle. The second panel facing sheet may then be applied and the paired inturned flanges extending around the vertical and horizontal edges of the door body secured together. The door corner bracket may then be applied in a manner so that the bearing section of the mounting pintle extends through the bearing bore of the corner bracket. The bearing assembly may be pocketed within the exposed bearing cavity of the door corner bracket before or after the corner bracket is applied to the corner of the door body. During the manufacturing process, the secondary door brackets and door bracings as desired may also be conveniently applied. Thus, the torsional hinge assembly of this invention may be quickly and effectively incorporated into the door body with precision accuracy during the manufacture thereof to provide a torsional hinge assembly which forms a permanent part of the door body.

Other objects and advantages of this invention will become apparent as the disclosure proceeds.

While the characteristic features of this invention are particularly pointed out in the claims, the invention itself, and the manner in which it may be practiced, may be better understood by referring to the following description, taken in connection with the accompanying drawings forming a part of this disclosure, and in which:

Fig. I is a front elevation of a hollow metal door mounted between a pair of floor supported pilasters which define the door opening, this view showing the general outline of the torsional hinge assembly of this invention as contained within the door body;

Fig. II is a front elevation of a modified hollow metal door and a pair of ceiling suspended pilasters which define the door opening therebetween, this view showing the general outline of the torsional hinge assembly as contained within the door body;

Fig. III is a horizontal section taken through the door and adjacent pilasters as the same would appear when viewed along line III—III of Fig. I or Fig. II;

Fig. IIIA is a diagrammatic horizontal cross section of the door and adjacent pilasters wherein the door operating torsional hinge assembly has been adjusted to normally maintain the door partially inswung with respect to the door opening;

Fig. IIIB is another diagrammatic horizontal cross section of the door and associated pilasters in which the door operating torsional hinge assembly has been adjusted to normally maintain the door partially outswung with respect to the door opening;

Fig. IV is a fragmentary vertical section of the door and adjacent supporting pilaster as viewed along line IV—IV of Fig. I, this view revealing certain details of the torsional hinge assembly as contained within the door body and hinge mounting as the same would appear when the door is in substantially closed position;

Fig. V is a perspective view of the torsional hinge assembly shown in Figs. I and IV as the same would appear when the door associated therewith is in fully opened position, this view also showing a fragmentary section of the door supporting pilaster and its associated hinge bracket;

Fig. VI is a fragmentary vertical section of the modified door and adjacent door supporting pilaster as viewed along lines VI—VI of Fig. II, this view showing certain details of the associated torsional hinge assembly and its mounting as the same would appear when the door is in normally substantially closed position; and Fig. VII is a fragmentary perspective view of the torsional hinge assembly shown in Figs. II and VI as the same would appear when the door which encases the same has been swung into fully opened position.

Similar reference characters refer to similar parts throughout the several views of the drawings and specifications.

Torsional hinge assemblies constructed in accordance with this invention are particularly designed for installation into hollow metal doors, such as the doors 20 or 20' illustrated for purposes of exemplification in Figs. I and II. Such doors are generally formed from panel facing sheets 21 formed of sheet metal and between which the torsional rod assembly of this invention is positioned and enclosed. This torsional rod assembly generally comprises a torsion rod 1 contained within the door body and formed from spring steel of selected quality which can be torsionally twisted by the application of a twisting force to the body thereof, and upon release of the twisting force, will accurately return to its original untwisted state and without permanent deformation after being subjected to hundreds of thousands of repeated twisting strains during a long period of years. The spring steel used in forming the torsion rod 1 also possesses extreme fatigue resistance and characteristically requires the same magnitude of twisting force, and possesses the same magnitude of reflex power in returning to its normal untwisted state, after the application thereto of hundreds of thousands of torsional twists spread over a period of many years. As shown in the drawings, the torsion rod 1 is positioned within the door body 20 or 20' and between the panel facing sheets 21 thereof, adjacent the vertical hinging edge of the door body, and extends vertically from a point adjacent the lower edge of the door body to the upper section thereof. While the torsion rod may be made substantially circular in cross section, it has been found that its door operating effectiveness is substantially enhanced by flattening one side face 2 or the opposite side faces thereof, so that its cross section is generally elliptical in form.

As an important feature of this invention, a swing member 3 contained within the door body is slidably adjustable on the body of the torsion rod 1 for substantially the full length thereof. The swing member 3 may be formed as a steel block of rectangular cross section which presents the side faces 3' thereof in bearing relation to the inside faces of the panel facing sheets 21 of the door 20 or 20'. The torsion rod 1 extends through a conforming bore extending through one end of the swing member 3, and the swing member may be adjustably held in fixed position by suitable means such as a set screw 4. By a proper vertical setting of the swing member 3, the torsion rod operates to supply to the swing member 3 a swinging force capable of swinging doors of different weights and swing characteristics.

The lower end of the torsion rod 1 is fixed to a mounting pintle 5 which is journaled in a lower corner bracket 15 fixed to the lower rear corner of the door body. The lower end of the mounting pintle 5 is fixed to the door supporting arm 41 of a hingle bracket 40 or 40' attached to the adjacent door supporting post or pilaster 30 or 30'. The upper end of the torsion rod 1 is guided in its turning movement by a suitable guide bracket 12 contained within the door body, and within which the upper end of the torsion rod is free to twist or rotate. The guide bracket 12 may comprise a channel shaped member whose side flanges 13 are suitably fixed within the door body in the upper section thereof, and whose flange connecting web 14 presents a guide hole 14' therein through which the upper end of the torsion rod 1 freely extends. The guide hole 14' serves to support the torsion rod in erect position and in proper alignment with the lower end thereof.

The mounting pintle 5 projects into the lower end of the door body and is adjustably fixed to the door supporting arm 41 of the hinge bracket 40 or 40' which is attached to the adjacent supporting pilaster 30 or 30'. The mounting pintle 5 provides a pivot for the lower end of the door. The mounting pintle 5 is formed of rigid material such as steel or the like which will not twist when twisting force is applied thereto. The mounting pintle 5 comprises an enlarged body section 6 having a conforming cavity in the upper end thereof into which the lower end of the torsion rod 1 is rigidly pocketed and fixed therein by welding, soldering or sweating treatment. A bearing section 7 extends downwardly from the body section 6 and is reduced in diameter so as to form a bearing shoulder 8 with the enlarged body section 6 of the mounting pintle. The bearing section 7 terminates in a tapered section 9 whose exterior surface presents vertical ribs 9' as shown in Fig. VI which extends through the tapered hole in the supporting arm 41 of the hinge bracket 40 or 40'. The mounting pintle 5 terminates in a threaded end portion 10 to which a lock nut 11 may be applied.

By tightening the lock nut 11, the tapered section 9 of the mounting pintle 5 may be tightly drawn into the tapered hole of the supporting arm 41 to thereby rigidly lock the mounting pintle 5 to the supporting arm 41. The exposed lower end of the mounting pintle 5 may be provided with a tool receiving slot 10' to which a screwdriver may be applied, and by means of which the mounting pintle 5 may be angularly oriented upon loosening of the lock nut 11 for purposes hereafter described.

The lower corner of the doors 20 and 20' shown in Figs. I and II is reinforced by a lower corner bracket 15 as shown more particularly in Figs. IV to VII, comprising a horizontal leg which may present a horizontal leg section 16 contoured in conformity with the lower edge of the door body, and which is integral with a secondary leg section 16' which presents a depressed face designed to receive the supporting arm 41 of the hinge bracket 40 or 40' which is attached to the supporting pilaster. The door corner bracket 15 is also provided with a vertical leg 17 which may be contoured in conformity with the adjacent vertical edge of the door body. The horizontal sections 16 and 16' may be joined to the vertical leg 17 by side flanges 17' which overlap the outside faces of the panel facing sheets 21 of the door.

The inside face of the depressed horizontal section 16' of the lower corner bracket 15 is provided with a boss portion 18 formed integral therewith, which has a pintle receiving bore 18' extending therethrough, and which merges into an enlarged bearing pocket 18" which extends through the secondary and depressed horizontal leg section 16' of the lower corner bracket 15. The bearing pocket 18" is designed to receive and contain a thrust bearing 19 which seats on the upper face of the supporting arm 41 of the hinge bracket 40 or 40' attached to the door supporting pilaster, and which serves to rotatably support the lower corner bracket 15. A crescent shaped bearing washer 19' is clamped between the upper face of the boss section 18 of the door corner bracket 15 and the adjacent shoulder 8 of the mounting pintle 5. When the lock nut 11 is tightened, the bearing washer 19' cooperates with the thrust bearing 19 to provide a nonvibratory bearing assembly between the mounting pintle 5, the boss section 18 of the door corner bracket 15 and the supporting arm 41 of the hinge bracket 40 or 40'.

Torsional hinge assemblies constructed in accordance with this invention are particularly designed for association with hollow metal doors, such as the door 20 shown in Fig. I, or the door 20' shown in Fig. II. These doors may be constructed from a pair of spaced panel facing sheets 21 presenting inturned flanges 22 along the vertical and horizontal edges thereof as shown in Figs. III, IV and VI. In the preferred form of this invention, the paired inturned flanges 22 terminate in outwardly flared lips 23 which are substantially in abutment at the inner rebent edges thereof. The paired out-turned lips 23 may be secured together by spot welds to provide a rigid door construction. Prior to spot weld securement of the out-turned lips 23 of the facing sheets 21, the inner space between the facing sheets is substantially filled with sound deadening and panel sheet bracing insulation 25 which may comprise slabs of fibre glass, a cellular paperboard core, or any other sound insulating and panel stiffening material. The exposed vertical and horizontal edges of the door structure are trimmed by edging strips 26 which may present an arcuately contoured outer face 26' which terminates in inturned lip portions 26" which interlock with the out-turned lips 23. The semi-tubular edging strips 26 are designed to telescope over the out-turned lips 23 of the panel facing sheets 21 in a manner so that the inturned lip portions 26" of the edging strip interlock with the out-turned lips 23 of the door body. The meeting ends of the edging strips 26 at the exposed corners of the door structure may be mitre cut to provide smooth corner joints.

The lower corner bracket 15 for the doors 20 and 20' is fitted so that its horizontal leg section 16 seats against the adjacent inturned flanges 22 at the lower horizontal edge of the door, with the free end of the leg section 16 forming a finished joint with the adjacent end of the horizontal edging strip 26. The vertical leg 17 of the lower corner bracket 15 seats against the adjacent inturned vertical flanges 22 of the door, with the upper end thereof forming a finished joint with the adjacent lower end of the vertical edging strip 26. The corner bracket 15 is secured to the door body as by means of suitable screws which may extend through the horizontal leg section 16 and vertical leg 17 of the corner bracket and are threaded into the adjacent inturned flanges 22 of the door body.

The paired floor supporting pilasters 30 which define the door opening of the structure shown in Fig. I, and the paired ceiling supported pilasters 30' which define the door opening of the structure shown in Fig. II, may also be of hollow metal construction, each formed by a pair of panel facing sheets 31 formed of metal, plastic or other strong sheeting material. The paired facing sheets 31 present paired inturned flanges 32 along the exposed vertical and horizontal edges of the pilaster, each pair of inturned flanges terminating in out-turned lips 33 which are secured together as by weldments 34 exteriorly applied at spaced points along the crevice or crotch defined between the out-turned lips 33 as shown in Figs. III, V and VII. Each pilaster is packed with sound deadening and panel sheet bracing insulation material 35 such as fibre glass, cellular paperboard core, or other suitable sound deadening and panel sheet bracing material, which is inserted prior to welding securement of the out-turned lips 33 of the panel facing sheets thereof. The exposed vertical and horizontal edges of each pilaster structure are trimmed by semi-tubular edging strips 36 each having an attractively contoured outer face 36', and paired inturned lip portions 36" designed to telescopically interlock with the outturned lips 33 of the pilaster facing sheets 31.

The supporting end of each pilasters 30 and 30' is rigidly secured to either the horizontal floor forming wall or ceiling wall of the building as by means of a horizontal bar 37 suitably secured to the attaching end of the pilaster as by means of a suitable U-shaped bracket, as diagrammatically illustrated in Figs. I and II. A pair of wall securing bolts or lag screws 37' extend through the ends of the securing bar 37 and are bolted or locked to the horizontal wall of the building. The supported end of the pilaster and its securing bar 37 and lag screws 37', may be concealed within a tubular shoe 38 which telescopes over the pilaster and is designed to seat against the horizontal wall of the building on which the pilaster is mounted. The building space may be divided into cubicles as by means of dividing partitions 39 as shown in Figs. I, II and III. These dividing partitions may be formed from a pair of panel facing sheets separated by sound deadening and panel sheet bracing insulation, and one vertical edge thereof may be suitably secured to the vertical building wall and the other vertical edge thereof secured to the adjacent supporting pilaster 30 or 30'.

The lower hinge bracket 40 or 40' which supports the weight of the door structure 20 or 20' may be of any desired design but can advantageously be made as a one piece casting. The hinge bracket 40 as shown in Figs. I, IV and V presents a vertical leg 42 which seats against the vertical inturned flanges 32 of the adjacent pilaster 30 and is provided with a pair of spaced side wings 44 which telescope over the panel facing sheets 31 of the pilaster and are secured to the pilaster as by one or more securing bolts 44'. The upper end of the vertical leg 42 of the hinge bracket 40 forms a finished joint with the lower end of the adjacent edging strip 36 as shown in Figs. IV and V. The lower hinge bracket 40' which supports the door 20' as shown in Figs. II, VI and VII may be similar to the hinge bracket 40 above described, with the exception that hinge bracket 40' has a horizontal leg 43 which seats against the adjacent inturned flanges 32 at the horizontal edge of the pilaster 30' and forms a finished joint with the adjacent horizontal edging strip 36.

The upper end of the door 20 as shown in Figs. I and IV may be swingably hinged to an upper hinge bracket 45 which may be similar to the lower hinge bracket 40' previously described. The upper hinge bracket 45 may be formed as a one piece casting which fits over the upper corner of the door supporting pilaster 30, and presents a door supporting arm 46 and a vertical leg 47 which fits over the inturned flanges 32 along the vertical edge of the pilaster body, and may be shaped to provide a finished joint with the adjacent end of the vertical edging strip 36. The hinge bracket 45 is also provided with a horizontal leg 48 which seats against the inturned flanges 32 extending along the adjacent horizontal edge of the pilaster body, with the terminal end thereof forming a finished joint with the adjacent horizontal edging strip 36. The bracket 45 is provided with side wings 49 which telescope over the pilaster facing sheets 31 and are secured thereto as by bolts 49'. The projecting door supporting arm 46 has a hinge pintle 55 projecting downwardly therefrom and to which the upper rear corner of the door 20 is pivotally connected.

The upper rear corner of the door 20 as shown in Figs. I and IV, is provided with a corner bracket 50 which is fitted over the upper rear corner of the door and may be formed as a one piece casting. The upper corner bracket 50 presents a horizontal leg section 51, which snugly seats against the horizontal inturned door flanges 22, with the terminal end of the horizontal leg section 51 forming a finished joint with the adjacent end of the upper horizontal edging strip 26 of the door. The corner bracket 50 is also provided with a vertical leg 52 which snugly seats against the adjacent inturned flanges 22 extending along the vertical hinging edge of the door, the terminal end of the vertical leg 52 being designed to form a finished joint with the adjacent end of the vertical edging strip 26. The horizontal and vertical legs 51—52 are joined by a pair of side flanges 52' which interfit with the adjacent panel facing sheets 21 of the door.

The horizontal leg of the upper corner bracket 50 presents a depressed leg section 51' over which the hinging arm 46 of the upper hinge bracket 45 extends. The depressed section 51' has a bearing boss 53 therebelow which presents a bearing bore in which a bearing cup 54 is pocketed. A hinge pintle 55 extends through the hinging arm 46 of the upper hinge bracket 45 and may be journaled thereon. The lower end of the hinge pintle 55 extends into the locking cup 54 and its bearing end may be deformed in conformity with the deformed side walls of the locking cup 54, as shown in Fig. IV to prevent inadvertent removal of the hinging pintle 55. Since the weight of the door is carried by the thrust bearing 19 and the supporting arm 41 of the lower hinge bracket 40, no door weight is applied to the upper hinge pintle 55.

In the door structure 20, the guide bracket 12 is supported by a bracing channel 56 which is contained within the door body and which extends horizontally between the panel facing sheets 21 thereof, as shown in Figs. I, IV and V. The bracing channel 56 presents side flanges 57 which brace against the inside faces of the panel facing sheets 21 and are joined by a web section 58. The upwardly extending side flanges 13 of the guide bracket 12 telescope into the downwardly extending side flanges 57 of the bracing channel 56 and may be secured thereto as by spot welding. The downward extending flanges 57 of the bracing channel 56 may also be secured as by welding to the inside faces of the adjacent panel sheets 21.

When the door 20 and its torsional hinge assembly is mounted upon the hinge brackets 40 and 45 of the pilaster 30, the mounting pintle 5 and the torsion rod connected thereto may be angularly oriented to set the residence position of the door in fully closed position, as shown in Fig. III, or in inswung or outswung position, as shown in Figs. IIIA and IIIB. This adjustment is accomplished by loosening the lock nut 11 and turning the mounting pintle 5, as by means of a screwdriver applied to the exposed slot 10' in the end thereof, until the mounting pintle 5 and torsion rod 1 has been oriented as desired. The lock nut 11 is then tightened to rigidly fix the mounting pintle 5 to the supporting arm 41 of the lower hinge bracket 40.

When the door 20 is swung into open position, a twisting force is applied to the torsion rod 1 as shown in Fig. V which deforms that body section of the rod which extends between the mounting pintle 5 and the swing block 3; the body section of the torsion rod above the swing block 3 having no twisting force applied thereto. The energy stored in the twisted body section of the rod which extends between the swing block 3 and mounting pin 5 is sufficient in magnitude to positively swing the door from forcibly opened position to normal residence position.

The upper section of the door 20' as shown in Figs. II and VI may be swingably hinged to an upper hinge bracket 60 having a door hinging arm 61 which projects laterally from the mid section of a vertical leg 62 which joins a pair of side wings 63 which telescope over the panel facing sheets 31 of the door supporting pilaster 30' and are secured thereto as by bolts 63'. The upper and lower ends of the vertical leg 62 are designed to provide finished joints with the adjacent ends of the pilaster edging strips 36. The hinging arm 61 is also provided with a bearing sleeve 61' through which a hinge pintle 70 projects.

The door structure 20' has an upper corner bracket 65 which presents a U-shaped inset section into which the hinging arm 61 of the upper hinge bracket 60 extends. The corner bracket 65 may be made as a one piece casting which presents a horizontal leg 66 which terminates in a tapered locking tongue 66' which extends into the adjacent end of the semi-tubular edging strip 26 at the upper horizontal edge of the door 20'. A vertical leg section 67 extends downwardly from the horizontal leg 66 and is joined to a lower vertical leg section 68 by the U-shaped inset section into which the hinging arm 61 extends. The lower vertical leg section 68 is provided with a downwardly extending locking tongue 68' which projects into the adjacent end of the vertical extending semi-tubular edging strip 26. The lower vertical leg section 68 may also be provided with an inner bracing tongue 68" which overlaps the inside face of the inturned flanges 22 extending along the vertical edge of the door body. The U-shaped inset section presents a pair of upper and lower bearing arms 69 and 69' which are joined by a connecting web section 69". The hinge pintle 70 extends through aligned bores formed in the horizontal leg 66, upper bearing arm 69, the sleeve bearing 61' of the door hinging arm 61 of the hinge bracket 60, and the lower bearing arm 69'. The bore of the lower bearing arm 69' contains a locking cup 71 which receives the lower end of the hinge pintle 70, the lower end of the hinge pintle 70 being deformed in conformity with the deformed side wall of the bearing cup 71 to prevent inadvertent removal of the hinge pintle 70. Since the weight of the door 20' is carried by the thrust bearing 19 and the supporting arm 41 of the lower hinge bracket 40', no door weight is applied to the upper hinge pintle 70.

Since the inturned flanges 22 of the door body are removed in the areas occupied by the horizontal leg 66 and upper and lower vertical leg sections 67 and 68 of the corner bracket 65, the door body in this area is reinforced by a pair of upper and lower reinforcing channels 72 and 75 as shown in Figs. II, VI and VII. The upper reinforcing channel 72 presents upwardly extending flanges 73 secured in bracing relation to the inside faces of the panel facing sheets 21 and are connected by a web section 74 positioned above the upper bearing arm 69 of the corner bracket 65. The lower reinforcing channel 75 has its web section 76 in abutting relation to the under face of the lower bearing arm 69' of the corner bracket 65, and presents its side flanges 77 in bracing relation to the inside faces of the panel facing sheets 21. The upper and lower reinforcing channels 72 and 75 may be connected and braced by tongue portions 74' and 76' which may be struck out from the web sections 74—76 of the channels 72—75 and secured together as by spot welds. The side flanges 13 of the guide bracket 12 telescope into the side flanges 77 of the lower reinforcing channel 75 and secured thereto as by spot welds.

The door structure 20' as thus assembled presents the hinge pintle 70 in axial alignment with the torsion rod 1 and the mounting pintle 5. The upper end of the torsion rod 1 is free to rotate in the conforming hole 14' provided by the guide bracket 12. The mounting pintle 5 and the torsion rod 1 connected thereto may be angularly oriented to set the residence position of the door in fully closed position, or in inswung or outswung position, by turning the mounting pintle 5 by the application of a screwdriver to the exposed end thereof until the mounting pintle 5 and torsion rod 1 has been oriented as desired. The lock nut 11 is then tightened to rigidly fix the mounting pintle 5 to the supporting arm 41 of the lower hinged bracket 40'.

When the door 20' is swung into open position as indicated in Fig. VII, a twisting force is applied to that section of the torsion rod which extends between the mounting pintle 5 and the swing member 3; the torsion rod section extending above the swing member 3 having no torsion force applied thereto. The energy stored in the twisted body section of the rod which extends between the swing member 3 and mounting pin 5, is sufficient in magnitude to positively swing the door from its forcibly opened position to normal residence position.

By a proper vertical setting of the swing member 3 during manufacture of the door and its torsional rod assembly, the length of the body section of the torsion rod which extends between the swing member 3 and mounting pintle 5 may be varied as desired to accommodate the torsional hinge assembly to doors of different weights and inherent gravitational and frictional resistance to swinging movement. In this manner, the energy which is stored in the body section of the torsion rod when the door is forcibly opened, may be accurately determined and measured to insure automatic closing movement of the door from its forcibly opened position to normal residence position. The resident position of the door 20 or 20' can also be accurately set by angular orientation of the mounting pintle 5 and its torsion rod 1 after the door has been fully installed and mounted on the upper and lower hinge brackets.

The doors 20 or 20' and adjacent pilasters 30 and 30' may be provided with any desired type of latch 78 and door stop 79 as shown in Fig. II.

While certain novel features of this invention have been above disclosed and are pointed out in the claims, it will be understood that various omissions, substitutions and changes may be made by those skilled in the art, without departing from the spirit of this invention.

What is claimed is:

1. A torsionally operated door assembly including in combination, a door body presenting spaced facing panels secured together along the vertical and horizontal edges thereof, a corner bracket secured to the lower rear corner of the door body and designed to be supported by the projecting arm of a hinge bracket, a torsion rod contained within the door body and positioned between the facing panels and in substantially parallel relation to the hinging edge of the door body, a mounting pintle in axial alignment with said torsion rod and fixed to one end of said torsion rod, said mounting pintle extending through said corner bracket and having an end section exterior to the corner bracket designed for securement to the supporting arm of the hinge bracket, and a swing member extending laterally from said torsion rod and substantially in bearing contact with the inside surfaces of the facing panels of the door body; said swing member being secured to said torsion rod during manufacture in such predetermined spaced relation with respect to said mounting pintle that the torsional forces, stored in that section of the torsion rod extending between the mounting pintle and swing member upon forcibly swinging the door out of normal residence position, is sufficient to effectively return the released door to normal residence position.

2. A torsionally operated door assembly including in combination, a door body presenting spaced facing panels secured together along the vertical and horizontal edges thereof, a corner bracket secured to the lower rear corner of the door body and designed to be supported by the projecting arm of a hinge bracket, a torsion rod contained within the door body and positioned between the facing panels and in substantially parallel relation to the hinging edge of the door body, a mounting pintle in axial alignment with said torsion rod and fixed to one end of said torsion rod, said mounting pintle extending through said corner bracket and having an end section exterior to the corner bracket designed for securement to the supporting arm of the hinge bracket, a thrust bearing pocketed in said corner bracket in surrounding relation to a section of said mounting pintle and designed to be supported by the projecting arm of the hinge bracket, and a swing member secured to said torsion rod during manufacture in predetermined spaced relation to said mounting pintle and extending laterally from said torsion rod and substantially in bearing contact with the inside surfaces of the facing panels of the door body.

3. A torsionally operated door assembly including in combination, a door body presenting spaced facing panels secured together along the vertical and horizontal edges thereof, a corner bracket secured to the lower rear corner of the door body and designed to be supported by the projecting arm of a hinge bracket, a torsion rod contained within the door body and positioned between the facing panels and in substantially parallel relation to the hinging edge of the door body, a mounting pintle in axial alignment with said torsion rod and fixed to the lower end of said torsion rod, said mounting pintle extending through said corner bracket and having an end section exterior to the corner bracket designed for securement to the supporting arm of the hinge bracket, guide means within the upper section of the door body for rotatably supporting the upper end of said torsion rod in axial alignment with said mounting pintle, and a swing member secured to and extending laterally from said torsion rod between the ends thereof and substantially in bearing contact with the inside surfaces of the facing panels of the door body.

4. A torsionally operated door assembly including in combination, a door body presenting spaced facing panels secured together along the vertical and horizontal edges thereof, a corner bracket secured to the lower rear corner of the door body and designed to be supported by the projecting arm of a hinge bracket, a torsion rod contained within the door body and positioned between the facing panels and in substantially parallel relation to the hinging edge of the door body, a mounting pintle in axial alignment with said torsion rod and fixed to the lower end of said torsion rod, said mounting pintle extending through said corner bracket and having an end section exterior to the corner bracket designed for securement to the supporting arm of the hinge bracket guide, means within the upper section of the door body for rotatably supporting the upper end of said torsion rod in axial alignment with said mounting pintle, and a swing member extending laterally from said torsion rod between the ends thereof and substantially in bearing contact with the inside surfaces of the facing panels of the door body; said swing member being fixed to said torsion rod in such predetermined spaced relation with respect to said mounting pintle that the torsional forces, stored in that section of the torsion rod extending between the mounting pintle and swing member upon forcibly swinging the door out of normal residence position, is sufficient to effectively return the released door to normal residence position.

5. A torsionally operated door assembly including in combination, a door body presenting spaced facing panels secured together along the vertical and horizontal edges thereof, a corner bracket secured to the lower rear corner of the door body and designed to be supported by the projecting arm of a hinge bracket, a torsion rod contained within the door body and positioned between the facing panels and in substantially parallel relation to the hinging edge of the door body, a mounting pintle in axial alignment with said torsion rod and fixed to the lower end of said torsion rod, said mounting pintle extending through said corner bracket and having an end section exterior to the corner bracket designed for securement to the supporting arm of the hinge bracket, guide means within the upper section of the door body for rotatably supporting the upper end of said torsion rod in axial alignment with said mounting pintle, a thrust bearing pocketed in said corner bracket in surrounding relation to a section of said mounting pintle and designed to be supported by the projecting arm of the hinge bracket, and a swing member secured to and extending laterally from said torsion rod between the ends thereof and substantially in bearing contact with the inside surfaces of the facing panels of the door body.

6. A torsionally operated door assembly including in combination, a door body presenting spaced facing panels secured together along the vertical and horizontal edges thereof, a corner bracket secured to the lower rear corner of the door body and designed to be supported by the projecting arm of a hinge bracket, a torsion rod contained within the door body and positioned between the facing panels and in substantially parallel relation to the hinging edge of the door body, a mounting pintle in axial alignment with said torsion rod and fixed to the lower end of said torsion rod, said mounting pintle extending through said corner bracket and having an end section exterior to the corner bracket designed for securement to the supporting arm of the hinge bracket, a thrust bearing pocketed in said corner bracket in surrounding relation to a section of said mounting pintle and designed to be supported by the projecting arm of the hinge bracket, guide means within the upper section of the door body for rotatably supporting the upper end of said torsion rod in axial alignment with said mounting pintle, and a swing member extending laterally from said torsion rod between the ends thereof and substantially in bearing contact with the inside surfaces of the facing panels of the door body; said swing member being secured to said torsion rod during manufacture in such predetermined spaced relation with respect to said mounting pintle that the torsional forces, stored in that section of the torsion rod extending between the mounting pintle and swing member upon forcibly swinging the door out of normal residence position, is sufficient to effectively return the released door to normal residence position.

7. A torsionally operated door assembly including in combination, a door body presenting spaced facing panels secured together along the vertical and horizontal edges thereof, a supporting pilaster having lower and upper hinge brackets secured thereto each of which presents a door supporting arm, a hinge pintle pivotably connecting the door supporting arm of the upper hinge bracket to the upper end of the door body, a corner bracket secured to the lower rear corner of the door body and supported by the projecting arm of said lower hinge bracket, a torsion rod contained within the door body and positioned between the facing panels and in substantially parallel relation to the hinging edge of the door body, a mounting pintle in axial alignment with said hinge pintle and torsion rod and fixed to the lower end of said torsion rod, said mounting pintle extending through said corner bracket and having a tapered end section exterior to the corner bracket projecting through the supporting arm of the lower hinge bracket, means for angularly orienting and fixedly securing said mounting pintle to the projecting arm of said lower hinge bracket, guide means within the upper section of the door body for rotatably supporting the upper end of said torsion rod in axial alignment with said hinging pintle and mounting pintle, and a swing member fixed to and extending laterally from said torsion rod between the ends thereof and substantially in bearing contact with the inside surfaces of the facing panels of the door body.

8. A torsionally operated door assembly including in combination, a door body presenting spaced facing panels secured together along the vertical and horizontal edges thereof, a supporting pilaster having lower and upper hinge brackets secured thereto each of which presents a door supporting arm, a hinge pintle pivotably connecting the door supporting arm of the upper hinge bracket to the upper end of the door body, a corner bracket secured to the lower rear corner of the door body and supported by the projecting arm of said lower hinge bracket, a torsion rod contained within the door body and positioned between the facing panels and in substantially parallel relation to the hinging edge of the door body, a mounting pintle in axial alignment with said hinge pintle and torsion rod and fixed to the lower end of the torsion rod, said mounting pintle extending through said corner bracket and having a tapered end section exterior to the corner bracket projecting through the supporting arm of the lower hinge bracket, means for angularly orienting and fixedly securing said mounting pintle to the projecting arm of said lower hinge bracket in accordance with the desired residence position of the door, guide means within the upper section of the door body for rotatably supporting the upper end of said torsion rod in axial alignment with said hinging pintle and mounting pintle, and a swing member extending laterally from said torsion rod between the ends thereof and substantially in bearing contact with the inside surfaces of the facing panels of the door body; said swing member being fixed to said torsion rod in such predetermined spaced relation with respect to said mounting pintle that the torsional forces, stored in that section of the torsion rod extending between the mounting pintle and swing member upon forcibly swinging the door out of residence position, is sufficient to effectively return the released door to normal residence position.

9. A torsionally operated door assembly including in combination, a door body presenting spaced facing panels secured together along the vertical and horizontal edges thereof, a supporting pilaster having lower and upper hinge brackets secured thereto each of which presents a door supporting arm, a hinge pintle pivotally connecting the door supporting arm of the upper hinge bracket to the upper end of the door body, a corner bracket secured to the lower rear corner of the door body, a torsion rod contained within the door body and positioned between the facing panels and in substantially parallel relation to the hinging edge of the door body, a mounting pintle in axial alignment with said hinge pintle and torsion rod and fixed to the lower end of the torsion rod, said mounting pintle extending through said corner bracket and having a tapered end section exterior to the corner bracket projecting through the supporting arm of the lower hinge bracket, a thrust bearing pocketed in said corner bracket in surrounding relation to a section of said mounting pintle and supported by the projecting arm of said lower hinge bracket, means for angularly orienting and fixedly securing said mounting pintle to the projecting arm of said lower hinge bracket in accordance with the desired residence position of the door, guide means within the upper section of the door body for rotatably supporting the upper end of said torsion rod in axial alignment with said hinging pintle and mounting pintle, and a swing member extending laterally from said torsion rod between the ends thereof and substantially in bearing contact with the inside surfaces of the facing panels of the door body; said swing member being fixed to said torsion rod in such predetermined spaced relation with respect to said mounting pintle that the torsional forces, stored in that section of the torsion rod extending between the mounting pintle and swing member upon forcibly swinging the door out of residence position, is sufficient to effectively return the released door to normal residence position.

References Cited in the file of this patent

FOREIGN PATENTS

| | | |
|---|---|---|
| 9,795 | Germany | Aug. 12, 1879 |
| 513,556 | Great Britain | Oct. 16, 1939 |